(12) United States Patent
Odell et al.

(10) Patent No.: US 7,838,570 B2
(45) Date of Patent: Nov. 23, 2010

(54) RADIATION CURABLE INKS

(75) Inventors: Peter G. Odell, Mississauga (CA);
Eniko Toma, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 832 days.

(21) Appl. No.: 11/034,856

(22) Filed: Jan. 14, 2005

(65) Prior Publication Data
US 2006/0158492 A1 Jul. 20, 2006

(51) Int. Cl.
*C09D 11/00* (2006.01)
*C08F 2/50* (2006.01)

(52) U.S. Cl. ............................... 522/7; 522/14; 522/15; 522/25; 522/75; 522/83; 522/170; 522/181; 522/182

(58) Field of Classification Search ............... 522/7, 522/15, 25, 14, 75, 83, 170, 181, 182; 427/466
See application file for complete search history.

(56) References Cited

U.S. PATENT DOCUMENTS

| | | | | |
|---|---|---|---|---|
| 4,912,014 A | * | 3/1990 | Feldman | 430/202 |
| 5,535,673 A | * | 7/1996 | Bocko et al. | 101/211 |
| 6,025,017 A | * | 2/2000 | Roth | 427/146 |
| 6,040,040 A | * | 3/2000 | Rainbow | 428/32.6 |
| 6,114,404 A | * | 9/2000 | Deeken et al. | 522/88 |
| 6,197,422 B1 | * | 3/2001 | Murphy et al. | 428/378 |
| 6,350,792 B1 | * | 2/2002 | Smetana et al. | 522/81 |
| 6,379,444 B1 | * | 4/2002 | Adkins et al. | 106/31.6 |
| 6,536,889 B1 | | 3/2003 | Biegelsen et al. | |
| 6,547,380 B2 | | 4/2003 | Smith et al. | |
| 6,561,640 B1 | | 5/2003 | Young | |
| 6,720,042 B2 | * | 4/2004 | Ylitalo et al. | 428/32.26 |
| 6,878,470 B2 | * | 4/2005 | Kawamura et al. | 428/690 |
| 6,896,937 B2 | * | 5/2005 | Woudenberg | 427/511 |
| 7,592,376 B2 | * | 9/2009 | Crivello | 522/15 |

OTHER PUBLICATIONS

Ciba Specialty Chemicals, ISO 9001, "Ciba Additives for Ultraviolet (UV) Curing", pp. 2, 8, 16, 23, 25 and 44, 1997.*

* cited by examiner

*Primary Examiner*—Susan W Berman
(74) *Attorney, Agent, or Firm*—Oliff & Berridge, PLC

(57) ABSTRACT

An ink used preferably in jet ink devices includes an ink vehicle, the ink vehicle being made up either (a) a first component curable by a first polymerization route and an associated photointiator, and a second component curable by a second polymerization route and as associated photoinitiator, wherein the second polymerization route is different from the first polymerization route, or (b) a component curable by a single polymerization route with a first and a second photoinitiator system in which the first system responds to longer wavelengths. An image may be formed by such inks by jetting onto a transfer member surface, curing the first component or partially curing the single component while upon the transfer member surface, transferring the ink to an image receiving surface, and completing curing. The first component is preferably curable via cationic polymerization and the second component is preferably curable via free radical polymerization.

11 Claims, No Drawings

RADIATION CURABLE INKS

BACKGROUND

Described herein are ink jet inks that can be cured via at least two different polymerization routes, and methods of forming an image with such inks by advantageously utilizing the different polymerization routes. Also described are ink jet inks that can be cured by a single polymerization route and that contain two photoinitiator systems that absorb radiation at different wavelengths.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to six rotations (incremental movements) of a substrate (e.g., an intermediate transfer member) with respect to the ink jetting head, i.e., there is a small translation of the printhead with respect to the substrate in between each rotation. This approach simplifies the printhead design, and the small movements ensure good droplet registration.

In certain ink jet devices, including piezoelectric devices, it is desirable to employ transfuse, i.e., a transfer and fusing step, in forming the image. Transfuse plays an important role in piezoelectric ink jet printers by enabling a high quality image to be built up on a rapidly rotating transfer member. This approach simplifies the print head design, while the small movements of the head ensures good droplet registration. Transfuse typically involves jetting the ink from the ink jet head onto an intermediate transfer member such as a belt or drum, i.e., a transfuse member. This allows the image to be rapidly built onto the transfer member and then subsequently transferred and fused to an image receiving substrate.

Hot melt inks typically used with ink jet printers of the aforementioned type utilize a wax based ink vehicle, e.g., a crystalline wax. Such solid ink jet inks provide vivid color images. These crystalline wax inks partially cool on the intermediate transfer member and are then pressed into the image receiving medium such as paper. Transfuse spreads the image droplet, providing a richer color and lower pile height. The low flow of the solid ink also prevents show through on the paper.

In particular, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is heated to approximately 60° C., so that the wax will cool sufficiently to solidify or crystallize. As the transfer member rolls over the recording medium, e.g., paper, the image comprised of wax based ink is pressed into the paper.

However, the use of crystalline waxes also has at least two shortcomings. First, the printhead must be kept at least at 130° C. throughout printing with the device. Moreover, if the printhead is cooled and re-warmed, a lengthy purge cycle that consumes significant amounts of ink must be carried out. Thus, use of crystalline wax inks requires high amounts of energy, an increasingly valuable commodity. Second, the brittle crystalline waxes do not provide robust images and are easily scratched. This is because wax based inks generally crystallize at temperatures greater than room temperature and therefore, the wax based ink that has been transferred to the recording medium is essentially as hard as it will get. The high energy consumption, waste of expensive ink during purging, and fragile images all cause customer dissatisfaction, and in some markets prevents sales penetration.

Xerox Corporation discovered that curing ultraviolet (UV) photosensitive ink jet inks by photoinitiation of the reactive inks can provide tough, permanent images on an image receiving substrate. See, for example, U.S. Pat. Nos. 6,561,640 and 6,536,889, each incorporated herein by reference in its entirety. These patents describe processes of forming ink jetted images using such UV curable inks. Co-pending Application Ser. No. 11/034,850, filed Jan. 14, 2005, now U.S. Pat. No. 7,270,408 entitled "Low Level Cure Transfuse Assist for Printing with Radiation Curable Ink", incorporated herein by reference in its entirety, describes ink compositions for use in such processes. Co-pending Application Ser. No. 11/034,714, filed Jan. 14, 2005, now U.S. Pat. No. 7,691,920 entitled "Ink Jet Ink of Functionalized Waxes", incorporated herein by reference in its entirety, describes ink compositions in which the ink vehicle comprises a wax monomer chain functionalized to include at least one reactive group curable upon exposure to radiation of an appropriate wavelength.

UV photocurable inks can be designed to have low viscosity and avoid the need to heat the printhead beyond what may be required for thermal stability. However, such low viscosity inks may be difficult to transfuse, the ink droplets may coalesce during drum rotation, and the low viscosity ink may show through an image receiving substrate, e.g., paper. The aforementioned Xerox Corporation patent properties describe conditions under which such inks may be partially cured on the transfer surface. Such partial cure increases the viscosity of the ink, thus preventing droplet coalescence and image show through. These partially cured, thickened inks have been successfully transferred to image receiving substrates, the viscous ink image possessing sufficient flow to adhere well to paper. Once transferred to the image receiving substrate, the ink image undergoes a final cure to achieve a hard, well adhered final image.

In the aforementioned patent properties, the partial curing is described to be performed via exposure to ultraviolet radiation. For example, the ink is partially cured to a desired rheology via a limited exposure to the UV radiation, with final curing being achieved by longer exposure to the UV radiation, or by utilizing different photoinitiators that have different UV sensitivity ranges. There is a window of optimum rheology to which the ink is desirably partially cured, where the ink drop on the transfer surface is sufficiently viscous to not flow and coalescence with its neighbors, yet can be flattened and spread to achieve the desired image quality and conform to the paper surface so that upon the second and final photocure, a robust, well adhered image is obtained. To achieve this rheology by controlling the length of exposure requires very controlled exposure processes and a very wide rheological window. A challenge is also the potential multiple exposures that an ink droplet may be subjected to during the image build up on the transfer member surface. The member may make 4-6 small incremental rotations as the ink is applied on each pass before transfer to the image receiving substrate occurs. If one envisions a constant illumination of the rotating transfer member, then the first droplets may experience up to six times the exposure of the last set of droplets, and therefore be cured to too great an extent prior to transfer to the image receiving substrate, resulting in reduced image quality and permanence.

SUMMARY

A much preferred situation would be to accomplish a single more precise change in rheology upon the transfer member surface through the complete polymerization of a discrete portion of the ink droplet vehicle. What is desired, then, is an ink jet ink that can be controllably and accurately partially cured to the desired extent upon the transfer member surface, and a method of forming an image with such ink that achieves a high quality, permanent image upon an image receiving substrate.

In a first embodiment, an ink jet ink is described that comprises an ink vehicle, wherein the ink vehicle comprises a first component curable by a first polymerization route, and a second component curable by a second polymerization route, wherein the second polymerization route is different from the first polymerization route.

In another embodiment, a method of forming an image is described, comprising jetting an ink jet ink comprising an ink vehicle, wherein the ink vehicle comprises a first component curable by a first polymerization route and a second component curable by a second polymerization route, wherein the second polymerization route is different from the first polymerization route, onto a transfer member surface; substantially completely to completely curing the first component while upon the transfer member surface; subsequently transferring the ink from the transfer member surface to an image receiving surface; and substantially completely to completely curing the second component following the transfer to the image receiving surface.

In the aforementioned embodiments, the first component may be curable via cationic polymerization and the second component is preferably curable via free radical polymerization. Alternatively, the first component may be curable via free radical polymerization polymerization and the second component is preferably curable via cationic polymerization.

In another embodiment, a method of forming an image is described, comprising jetting an ink jet ink comprising an ink vehicle, wherein the ink vehicle comprises a curable component and two different photoinitiator systems, onto a transfer member surface, wherein a first photoinitiator system responds to long wavelengths of light and a second photoinitiator system responds to shorter wavelengths of light, and wherein the first photoinitiator system is present in an amount insufficient to achieve complete curing of the curable component; exposing the ink on the transfer member surface to light having a wavelength to which the first photoinitiator system, but not the second photoinitiator system, responds; subsequently transferring the ink from the transfer member surface to an image receiving surface; and exposing the ink on the image receiving surface to light having a wavelength to which the second photoinitiator system responds.

DETAILED DESCRIPTION OF EMBODIMENTS

There are thus three approaches to achieve the required two stage cure of the ink in which the first stage cure increases the viscosity and the elastic properties of the ink to aid transfuse and the second stage provides a robust final image on the print substrate such as paper. In one embodiment, as mentioned above, cationic polymerization is carried out first using a long wavelength (e.g., about 390 to about 500 nm or higher) sensitive photoinitiator system, such as sensitized iodonium compounds, and a cationic curable monomer, followed by polymerization of the radical curable ink components using a photoinitiator effective at absorption wavelengths of about 280 to about 390 nm or less. In another embodiment, the radical portion of the ink is cured first using a photoinitiator sensitive to light of wavelengths from about 350 to about 500 nm followed by cationic curing of the appropriate ink components using light of wavelengths from about 200 to about 320 nm. In another embodiment, the ink vehicle is entirely radical or alternatively entirely cationically curable, but there are two sets of photoinitiators used, one that responds to long wavelengths of light such as camphorquinone for radical polymerization or sensitized iodonium compounds for cationic polymerization, and one that responds to shorter wavelengths of light. The long wavelength sensitive photoinitiators are employed at a sufficiently low concentration level that complete cure of the ink is not achieved. In this embodiment, well known shorter wavelength sensitive photoinitiators are used to complete the second stage of the cure.

In embodiments of the invention, the ink comprises a blend or mixture of two different systems that each is curable via a different polymerization route. For example, in a preferred embodiment, the ink is comprised of first component that undergoes cationic polymerization and a second component that undergoes radical polymerization.

With an ink including curable components curable via different polymerization routes, each of the two polymerization systems can be addressed separately. For example, the first polymerization may be effected upon the transfer member surface and the second polymerization effected after transfer to the image receiving substrate. In this manner, the component of the first polymerization system may be substantially completely to completely cured upon the transfer member surface, thereby achieving the desired increase in rheology (viscosity) of the ink without achieving full cure of the entire ink vehicle. As a result, the ink viscosity can be desirably increased to the same extent as with partial curing through controlled exposure to UV radiation, but without the need to closely control the exposure and without any of the potential problems associated with certain ink droplets receiving too much exposure. The ink on the transfer member surface having the first component cured may then be transferred to an image receiving substrate, e.g., paper, a transparency, fabric, or the like, where the second component may be substantially completely to completely cured via the second polymerization mechanism to achieve the end hard, well-adhered image.

The entire photopolymerizable ink vehicle is most preferably designed to have a viscosity of about 5 to about 20 cP, more preferably of about 8 to about 13 cP, at a temperature modestly above room temperature, for example from about 30 to about 50° C. The viscosity was measured using a Rheometrics (now TA Instruments) RFS rheometer. The ink may be liquid or solid at room temperature. The inks are thus inks that have an appropriate jetting viscosity at low temperatures, i.e., temperatures of about 30 to about 50° C., more preferably temperatures of about 35 to about 40° C. This is substantially lower than conventional wax-based inks that are jetted at temperatures of about 130° C. The low viscosity inks are thus jettable at substantially lower temperatures than conventional wax based inks.

Preferably, the cationic polymerizable component of the ink vehicle is comprised of at least a suitable monomer or oligomer.

In a preferred embodiment, the cationic polymerizable component includes monomers or oligomers that are selected to provide the optimum rheology through curing in the presence of the remainder of the ink vehicle. In this regard, the cationic monomers or oligomers are most preferably, for example, epoxides, vinyl ethers or styrenics. Vinyl ethers are especially preferred, as they possess low volatility, high reactivity and good health and safety properties. The cationically curable monomers may be chosen to be mono-, di- and/or multi-functional in order to obtain the most desirable rheology for transfuse.

Among suitable monomers, the following may be specifically identified: hexanedioic acid, bis[4-(ethenyloxy)butyl] ester; 1,3-benzenedicarboxylic acid, bis[4-(ethenyloxy)butyl]ester; 4-(vinyloxy)butyl stearate; 4-(vinyloxy)butyl benzoate; 4-(vinyloxymethyl)cyclohexylmethyl benzoate; vinyl octadecyl ether; vinyl iso-octyl ether; 1,2,4-benzenetricarboxylic acid; and tris[4-(ethenyloxy)butyl]ester.

An appropriate catalyst system for the cationically curable monomer or oligomer is included in the ink, and is not particularly limited. However, in preferred embodiments, the catalyst system is a sensitized acid, such as 5,7-diiodo-3-butoxy-6-fluorene (commercially available as H-Nu 470 from Spectra Group Ltd.) combined with diaryl iodonium hexafluoroantimonate (available as SR 1012 from Sartomer Company, Inc.). The absorption maximum of the sensitizer is 470 nm, and other sensitizers are available such H-Nu 535 and H-Nu 635 (Spectra Group, Ltd.) with absorption maxima of 535 nm and 635 nm, respectively.

The catalyst sensitizers may be selected to have any suitable absorption maximum, although preferably it has an absorption maximum substantially different from a wavelength at which the second polymerizable component of the system is to be cured. Where the cationic curable component is to be cured first, e.g., upon the transfer member surface, the cationic photoinitiator system responds to wavelengths of from about 390 nm to about 500 nm or higher. In this regard, it is most preferable to select a catalyst system for the cationically curable component that is sensitive to a longer wavelength of light than that at which the other curable component of the ink vehicle will be cured. In this way, the photoinitiators for the other curable component may be designed to not absorb the longer wavelengths of light, and thus premature initiation of polymerization of the other curable component can be avoided. In this same regard, then, where the cationic curable component is to be cured second, e.g., after curing of the first curable component and/or following transfer to an image receiving substrate, the cationic photoinitiator system then is preferably made to respond to shorter wavelengths of light, for example of from about 200 nm to about 320 nm.

The sensitizers are also preferably self-bleaching and are used in very small amounts (e.g., less than 5% by weight of the ink vehicle, preferably less than 2% by weight of the ink vehicle), and thus have little contribution to the final ink color.

The cationic photopolymerizable component of the ink vehicle is preferably cured using light supplied to the ink by a variety of possible techniques, including but not limited to a xenon lamp, laser light, microwave energized V bulb, filtered light transported via light pipes from a D or H bulb, light emitting diodes, etc. The curing light may be filtered, if desired or necessary, to remove lower wavelengths of light that might prematurely initiate the radical cure of the remainder of the ink vehicle.

The ink vehicle in these embodiments also comprises a second curable component that is polymerizable via a route that is different from the polymerization route of the first curable component (e.g., different from the cationic polymerization route described above).

Preferably, the additional curable component of the ink vehicle is a component curable by free radical initiation. This component is thus comprised of at least a radically polymerizable monomer or oligomer and at least one catalyst.

The radically polymerizable monomer or oligomer is most preferably an acrylate functional molecule. Ideally, the radically polymerizable monomer or oligomer has a relatively high rate of reaction, a relatively low viscosity, and good health and safety properties. The curable component must be jettable, and thus have a viscosity in the range about 5 to about 22 cps, preferably about 8 to about 13 cps, at temperatures from about 20° C. to about 60° C., preferably about 35° C. to about 45° C. The functionality of the acrylate species can be mono-, di- or more (tri- or multi-) highly substituted as required by the mechanical properties of the final image.

There are generally three major classes of acrylates: epoxy, polyester and polyurethane. Epoxy acrylates are often amine functionalized to act as synergists in the photoinitiation. Combined with an appropriate catalyst/photoinitiator, acrylates provide rapid cure to form tough materials with good adhesion.

The speed of cure of the monomer or oligomer may be controlled by raising the functionality of the acrylate. For instance, a trifunctional acrylate provides a more rapid cure rate than a difunctional acrylate. However, the higher functionality may produce a more brittle cured product, and may limit the ultimate extent of cure. As a result, in a preferred embodiment, a desirable balance of properties is achieved by using mixtures of acrylates, preferably mixtures of multifunctional monomer or oligomer acrylates, e.g., mixtures of difunctional and higher functional acrylates.

Based on the above criteria, a number of acrylate materials may be used in inks of embodiments of the invention. For example, as the multifunctional acrylate monomer or oligomer, mention may be made of diacrylates such as propoxylated neopentyl glycol diacrylate (available from Sartomer Co. Inc. as SR 9003), hexanediol diacrylate, tripropylene glycol diacrylate, dipropylene glycol diacrylate, and the like. As triacrylate or higher functionality monomers or oligomers, mention may be made of amine modified polyether acrylates (available as PO 83 F, LR 8869, and/or LR 8889 (all available from BASF Corporation)), trimethylolpropane triacrylate, dipentaerythritol penta-/hexa-acrylate, ethoxylated pentaerythritol tetraacrylate (available from Sartomer Co. Inc. as SR 494), and the like.

The ink vehicle may also include monofunctional acrylates. Monofunctional acrylates may be beneficially included in the ink vehicle for the purpose of viscosity adjustment. Suitable monofunctional monomers include: tridecyl acrylate, 2-phenoxyethyl acrylate, and 4-t-butylcyclohexyl acrylate.

The ink also includes a catalyst for curing of the radically polymerizable component. As the catalyst, mention may be made of photoinitiators such as 2,4,6-trimethylbenzoyldiphenylphosphine oxide (available as BASF Lucirin TPO); 2,4,6-trimethylbenzoylethoxyphenylphosphine oxide (available as BASF Lucirin TPO-L); bis(2,4,6-trimethylbenzoyl)-phenylphosphine oxide (available as Ciba Irgacure 819) and other acyl phosphines; 2-benzyl 2-dimethylamino 1-(4-morpholinophenyl)butanone-1 (available as Ciba Irgacure 369); titanocenes; and isopropylthioxanthone; 1-hydroxy-cyclohexylphenylketone; benzophenone; 2,4,6-trimethylbenzophenone; 4-methylbenzophenone; 2-methyl-1-(4-methylthio)phenyl-2-(4-morphorlinyl)-1-propanone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, for example such as ethyl-4-dimethylaminobenzoate and 2-ethylhexyl-4-dimethylamino benzoate. This list is not exhaustive, and any known photoinitiator that initiates the free radical reaction upon exposure to a desired wavelength of radiation such as UV light can be used without limitation.

Where the radically curable component is to be cured first, e.g., upon the transfer member surface, the photoinitiator system is preferably designed to respond to wavelengths of from about 350 nm to about 500 nm or higher. Where the radically curable component is to be cured second, e.g., after curing of the first curable component and/or following transfer to an image receiving substrate, the photoinitiator system then is preferably made to respond to shorter wavelengths of light, for example of from about 280 m to about 390 nm or less.

The total amount of photoinitiator included in the ink with respect to the radically curable component may be from, for example, about 0.5 to about 15%, preferably from about 1 to about 10%, by weight.

The morphology of the polymer network for both types of polymerizable components may be varied from linear polymer, using monofunctional monomers, to moderately branched, slightly crosslinked polymers, e.g., by including low amounts of di- or tri- (or multi-) functional monomers, up to extensive networks obtained with higher amounts of di- and tri- (or multi-) functional monomers.

In a preferred embodiment, the curable component of the first of the two stages of curing comprises about 5 to about 80% by weight of the ink vehicle, preferably about 10 to about 50% by weight of the ink vehicle. The curable component of the latter stage of curing preferably comprises about 5 to about 90% by weight of the ink vehicle, preferably about 20 to about 70% by weight of the ink vehicle.

In a most preferred embodiment, the first polymerizable component is a system that is cationically curable. The cationic curing is preferably effected after the ink is jetted onto the transfer member surface. The cationic curing is preferably substantially complete to complete, i.e., at least 75% of the cationically curable monomer or oligomer is cured (reacted or crosslinked) on the transfer member surface. This allows the rheology of the ink vehicle to be increased to a suitable extent for transfer of the image to an image receiving substrate such as paper.

The second polymerizable component thus is most preferably a system that is radically curable. The curing of this component is preferably effected after the ink image is transferred from the transfer member surface to the image receiving substrate. Following the transfer, the image on the substrate is exposed to the appropriate wavelength of light/radiation to effect the free radical polymerization. The curing achieved is preferably substantially complete to complete, i.e., at least 75% of the radically curable monomer or oligomer is cured (reacted or crosslinked). This allows for the hardened, tough final image to be achieved.

In an alternative embodiment, the ink vehicle is entirely radical or alternatively entirely cationically curable, but there are two sets of photoinitiators included in the ink, one that responds to long wavelengths of light and one that responds to shorter wavelengths of light. As the cationically or radically curable component of the ink vehicle, any of the aforementioned monomers or oligomers may be used. Also, as the two photoinitiator systems, preferably one of the photoinitiator systems comprises any of the photoinitiators for cationic polymerization described above, and the other of the photoinitiator systems comprises any of the photoinitiators for free radical polymerization described above.

In this embodiment, as in the embodiments discussed above, the photoinitiator system that is to be first cured should be selected to have a longer wavelength of absorption range than the photoinitiator system that is to be second cured. Preferably, the first cured photoinitiator system responds to light having a wavelength of 390 nm or more, while the second cured photoinitiator system responds to light having a wavelength of less than 390 nm.

For example, as the first cured photoinitiator that responds to longer wavelengths of light, mention may be made of camphorquinone for radical polymerization (absorption maximum at about 470 nm) or sensitized iodonium compounds for cationic polymerization (which may have varying absorption wavelengths depending on the sensitizer, e.g., ITX absorbs at about 390 nm, H-Nu470 absorbs at about 470 nm, etc). In this embodiment, well known shorter wavelength sensitive photoinitiators are used to complete the second stage of the cure.

The longer wavelength sensitive photoinitiators in this embodiment are preferably employed at a sufficiently low concentration level that complete cure of the ink is not achieved upon activation of the photoinitiator. Preferably, the first cured photoinitiator system is present in the ink in an amount such that the extent of curing is about 5 to about 75%, preferably about 10 to about 60%, of total curing. The first curing is preferably effected upon the transfer member surface, and the second curing is then effected upon the image receiving substrate.

Besides the first and second polymerizable components and catalysts, the inks also preferably include a colorant, e.g., a pigment or dye. The colorant is preferably readily dispersible in the ink vehicle.

As the dye or pigment colorant media, any suitable dye or pigment may be used without limitation so long as the colorant is dispersible within the ink vehicle. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGENT Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

The colorant is preferably included in the ink in an amount of from, for example, about 0.1 to about 15% by weight of the ink, preferably about 0.5 to about 8% by weight of the ink.

The inks of embodiments of the invention may further include conventional additives to take advantage of the known functionality associated with such conventional additives. Such additives may include, for example, defoamers, slip and leveling agents, pigment dispersants, etc.

The inks may be used in any type of ink jet printer including a thermal ink jet, acoustic ink jet or piezoelectric ink jet printer, but most preferably are used in a piezoelectric ink jet printer.

When using a piezoelectric ink jet printer, the temperature of the printhead is preferably maintained between about 25° C. and about 60° C. to achieve a preferable jetting viscosity of the low viscosity curable ink. If the temperature greatly exceeds the preferred range, the low viscosity curable ink may begin to polymerize and harden. If this occurs, the ink will thicken, and will not be properly ejected from the print head. If the temperature is too low, the ink may be too thick for jetting and may potentially clog the jets.

Embodiments described above will now be further illustrated by way of the following examples. In the following formulations, TZT represents a mixture of 2,4,6-trimethylbenzophenone, 4-methylbenzophenone and 2-methylbenzophenone available as Esacure TZT from Lamberti spa, Gallarate, Italy; Irgacure 184 is 1-hydroxycyclohexylphenylketone available from Ciba Specialty Chemicals, Charlotte, N.C.; Irgacure 907 is 2-methyl-1-(4-methylthio)phenyl-2-(4-morphorlinyl)-1-propanone available from Ciba Specialty Chemicals, Charlotte, N.C.; SR9003 is propoxylated neopentyl glycol diacrylate available from Sartomer Company, Exton Pa.; PO 43 F is an amine functionalized epoxy acrylate available from BASF, Spartanburg, S.C.; UVD-B154 is a dispersion of pigment blue 15:4 from Sun Chemicals, Cincinnati, Ohio; UVD-K007 is a dispersion of pigment black 7 from Sun Chemicals, Cincinnati, Ohio; UVD-R571 is a dispersion of pigment red 57 from Sun Chemicals, Cincinnati, Ohio; UVD-Y014 is a dispersion of pigment yellow 14 from Sun Chemicals, Cincinnati, Ohio; Laromer LR 8956 is a reactive tertiary amine available from BASF, Spartanburg, S.C.; TEGDVE is triethyleneglycol divinyl ether available from BASF, Spartanburg, S.C.; DECHC is 3,4-epoxycyclohexylmethyl-3,4-epoxycyclohexane carboxylate available as UVR-6107 from Dow Chemical Co., Midland, Mich.; UVI 6992 is a mixture of arylsulfonium hexafluorophophate salts available from Dow Chemical Co., Midland, Mich.; CGI 552 is 4-methylphenyl-(4-(2-methylpropyl)phenyl)iodonium hexafluorophosphate available from Ciba Specialty Chemicals, Charlotte, N.C. as Irgacure 250; ITX is isopropylthioxanthone available as Darocur ITX from Ciba Specialty Chemicals, Charlotte, N.C.; H-Nu470 is 5,7-diiodo-3-butoxy-6-fluorone available from Spectra Group Ltd., Maumee, Ohio; Vectomer 5015 is tris(4-vinyloxybutyl)trimellitate available from Morflex Inc., Greensboro, N.C.; Vikoflex 4050 is an epoxidized vegetable oil available from Arkema Inc. Philadelphia, Pa.; Laromer LR 8889 is an amine modified polyether acrylate available from BASF, Spartanburg, S.C.; Esacure 1001 M is a difunctional ketosulphone photoinitiator available from Lamberti spa, Gallarate, Italy.

Exposure to light was accomplished with a variety of equipment. Large area exposures were conducted using a F300S Ultraviolet Lamp System mounted on a LC-6 Benchtop Conveyor both available from Fusion UV Systems Inc., Gaithersburg, Md. This system used doped mercury lamps commonly designated as H, D, Q and V bulbs; the dopant determines the set of wavelengths the bulbs emit and all are available from Fusion UV. Light filters were sometimes used with the Fusion UV unit to eliminate light below 400 nm or below 450 nm wavelength. LED arrays from EXFO Photonic Solutions, Mississauga, ON were also used. These consisted of 100 diode elements arranged in a 5 mm by 5 mm square with one array emitting at 396 nm and a second array with emission centered at 470 nm. An 8 mm by 8 mm 100 element LED array emitting at 450 nm was also employed. An EXFO Novacure 2100 unit was also used with an 8 mm diameter light pipe and equipped with light filters to deliver either 320-500 nm wavelength light or 400-500 nm wavelength light.

EXAMPLES 1-6

The formulations are contained in Table 1, wherein all units are in grams. Examples were prepared by mixing the amounts given in the Table and then obtaining a test pattern by coating a Mylar sheet using a K-Proofer. These curable mixtures are formulated at 20% cationic curing vehicle in Examples 1-4 and 38% cationic curing vehicle in Examples 5 and 6. The number in the FusionUV refers to the number of passes at about 32 ft/min to obtain a hard film or complete cure in the UV Fusion unit employing an H bulb. Using long wavelength illumination from the LED, the total formulations should appear only partially cured as only the cationic vehicle is curing. Thus, cure in the context of these Examples means a noticeable increase in viscosity or gel like behavior of the coated film. The lower power LED correlates with the sensitivity established using the UV Fusion lamp. The NMR remark refers to evidence that the cure was selectively cationic consuming the vinyl ether groups and not acrylate; this test is described in Example 12.

TABLE 1

|  | Ex. 1 | Ex. 2 | Ex. 3 | Ex. 4 | Ex. 5 | Ex. 6 |
|---|---|---|---|---|---|---|
| TZT | — | — | 0.24 | 0.24 | — | — |
| Irgacure 184 | 0.24 | 0.24 | 0.16 | 0.16 | — | 0.24 |
| Irgacure 907 | — | — | — | — | — | — |
| SR 9003 | 6.16 | 6.16 | 5.52 | 5.52 | 6.4 | 6.16 |
| PO 43 F | 1.6 | 1.6 | 1.6 | 1.6 | 1.6 | 1.6 |
| UVD-B 154 40% pigm. | — | — | — | — | — | — |
| Laromer LR 8596 | — | — | 0.48 | 0.48 | — | — |
| TEGDVE | 1.85 | 1.94 | 1.94 | 1.89 | 4.9 | 1.92 |
| DECHC | — | — | — | — | — | — |
| UVI 6992 | 0.1 | — | — | 0.1 | — | — |

TABLE 1-continued

|  | Ex. 1 | Ex. 2 | Ex. 3 | Ex. 4 | Ex. 5 | Ex. 6 |
|---|---|---|---|---|---|---|
| CGI 552 | — | 0.05 | 0.05 | — | 0.25 | 0.05 |
| ATP | — | — | — | — | — | — |
| ITX | 0.01 | 0.01 | 0.01 | 0.01 | 0.013 | — |
| H-NU470 | — | — | — | — | — | 0.01 |
| Fusion UV | cured 15x | cured 6x | cured 1x | cured 2x | cured | cured |
| LED (396 nm) | no cure | gelling | cured | | | |
| NMR | | cationic 400 nm | | | cationic 400 nm | cationic 470 nm |

Evidence of selective cure can be found in NMR spectroscopy. The signal associated with the vinyl protons of the vinyl ether group disappear upon irradiation with light having a wavelength greater than 400 nm due to their consumption in a cationic initiated polymerization while the signal from the vinyl protons associated with the acrylate groups remains. Upon exposure to shorter wavelength UV light of 200-400 nm, the acrylate groups are then consumed.

EXAMPLE 7

The desired increase in viscosity is illustrated by curing with 400-500 nm light the cationic curable portion of the formulation of Example 4. In this case, the formulation was irradiated with 400-500 nm filtered light from an EXFO Photonic Solutions Novacure 2000 unit. The curable mixture was placed on the platen of a Rheometrics RFS rheometer, the cone element lowered and the formulation's rheology measured. The cone element was raised and the formulation exposed to light and then the rheology measured once again.

A significant increase in viscosity occurs after exposure to light. The observed non-Newtonian behavior of the fluid following exposure to light is consistent with a population of long chain polymers (from cationic curing) dissolved in uncured, radical curable monomers. This example is largely illustrative of the principle of selective cure, but it should be recognized that the rheometer measurement requires a much thicker film than the ink on a page. The fluid on the rheometer plate is 1-2 mm thick while an ink image would be 2-10 microns thick and thus the cure characteristics are much different. The thinner ink film would be expected to cure more extensively.

EXAMPLES 8-15

In Table 2, the ink constituents were combined in the stated proportions, all amounts in grams. All components except for the colorants were combined and the solids dissolved with the aid of an ultrasonic bath. Subsequently, the colorants were added and dispersed or dissolved using an ultrasonic bath.

TABLE 2

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| ITX | 3 | 3 | 3 | 3 | 3 | 3 | 3 | 3 |
| Irgacure 184 | 2 | 2 | 2 | 2 | 2 | 2 | 2 | 2 |
| Irgacure 907 | 2 | 2 | 2 | 2 | 2 | 2 | 2 | 2 |
| SR 9003 | 63.75 | 63.75 | 63 | 53.45 | 51.75 | 49.61 | 48.2 | 51 |
| PO 43 F | 20 | — | — | — | — | — | — | — |
| UVD-K007 (45% pigm.) | — | — | — | 13.3 | — | — | — | — |
| LR 8889 | — | 20 | 20 | 20 | 20 | 20 | 20 | 20 |
| UVD-B154 (40% pigm.) | — | — | — | — | 15 | — | — | 15 |

TABLE 2-continued

| | Ex. 8 | Ex. 9 | Ex. 10 | Ex. 11 | Ex. 12 | Ex. 13 | Ex. 14 | Ex. 15 |
|---|---|---|---|---|---|---|---|---|
| UVD-R571 (35% pigm.) | — | — | — | — | — | 17.14 | — | — |
| UVD-Y014 (32% pigm.) | — | — | — | — | — | — | 18.8 | — |
| Laromer LR 8956 | 6 | 6 | 6 | 6 | 6 | 6 | 6 | 6 |
| camphorquinone | 0.25 | 0.25 | 1 | 0.25 | 0.25 | 0.25 | — | 1 |
| Solvent blue 808 | 3 | 3 | 3 | — | — | — | — | — |

Selective cure of a portion of Examples 8, 10 and 15 using long wavelength illumination and a long wavelength sensitive photoinitiator (camphorquinone) were conducted. Example 8 with only 0.25% content of camphorquinone does not cure in air but will show evidence of partial cure when covered with a glass coverslip to limit the mobility of oxygen during the curing step. Examples 10 and 15 with higher camphorquinone levels partially cure in air. The cure trials were conducted on microscope slides using an EXFO 470 nm LED array.

Partial cure was evident in the fluid behavior: areas exposed to light, although fluid when scratched, would retain the scratch mark; in unexposed areas, the ink would flow back and "heal" the scratch. Using this cure criteria, the exposure requirements to obtain evidence of cure were 0.6 s at a 100% output of the LED device, which is approximately 15-20 mW cm$^{-2}$. Following the partial cure with LED light, the inks were cured to hardness using the Fusion UV unit and a "D" bulb with a substrate speed of 30 ft min$^{-1}$.

EXAMPLE 16

In this Example, an ink is formed that employs radical curing first to achieve partial cure for transfuse followed by cationic cure of the remainder of the vehicle to achieve final hard cure. The amounts in Table 3 are in grams.

TABLE 3

| | Example 16 |
|---|---|
| Irgacure 819 | 1 |
| Irgacure 369 | 1 |
| Irgacure 184 | 1 |
| Irgacure 907 | 1 |
| UVI 6992 | 2 |
| Laromer LR8956 | 5 |
| SR 9003 | 15 |
| DVE-3 | 40 |
| Vikoflex 4050 | 20 |
| Vectomer 5015 | 10 |
| Dye | 3 |

EXAMPLE 17

In this Example, an ink is formed that employs radical curing first to achieve partial cure for transfuse followed by cationic cure of the remainder of the vehicle to achieve final hard cure. The amounts in Table 4 are in grams.

TABLE 4

| | Example 17 |
|---|---|
| UVI 6992 | 4 |
| TEGDVE | 115 |
| ITX | 1 |
| Irgacure 369 | 1 |
| Irgacure 907 | 2 |
| Esacure 1001 M | 1 |
| SR 9003 | 40 |
| LR 8889 | 10 |
| Vectomer 5015 | 20 |
| UVD-B154 (40% pigm.) | 12 |

This formulation provided partial cure using 400-500 nm light from an Exfo Novacure 2000 unit. This ink was jetted successfully in a Xerox Phaser 850 printer modified to operate at lower temperatures. The UV Fusion H bulb was used for final cure.

While various embodiments have been described herein, it is evident that many alternatives, modifications and variations will be apparent to those skilled in the art. Accordingly, the preferred embodiments, as set forth above, are intended to be illustrative and not limiting. Various changes may be made without departing from the spirit and scope of the invention.

What is claimed is:

1. An ink comprising an ink vehicle, wherein the ink vehicle comprises at least one curable component, and at least two photoinitiator systems, wherein the at least one curable component comprises a first component curable by a first polymerization route and a second component curable by a second polymerization route, wherein the second polymerization route is different from the first polymerization route and the at least two photoinitiator systems include a first photoinitiator system for the first component and a second photoinitiator system for the second component, wherein the first component is at least one cationically curable material or at least one radically curable material, wherein when the first component is at least one cationically curable material and the first photoinitiator system responds to wavelengths of from 390 nm to about 500 nm or higher, the second component is at least one radically curable material and the second photoinitiator system responds to wavelengths of from about 280 nm to less than 390 nm, and wherein when the first component is at least one radically curable material and the first photoinitiator system responds to wavelengths of from about 350 nm to about 500 nm or higher, the second component is at least one cationically curable material and the second photoinitiator system responds to wavelengths of from about 200 nm to about 320 nm or less.

2. The ink according to claim 1, wherein the ink further includes at least one colorant.

3. The ink according to claim 1, wherein the first component comprises at least one cationically curable material.

4. The ink according to claim 3, wherein the at least one cationically curable material comprises an epoxide, a vinyl ether or a styrenic group.

5. The ink according to claim 1, wherein the first component comprises from about 5% to about 80% by weight of the ink vehicle.

6. The ink according to claim 1, wherein the second component comprises at least one radically curable material.

7. The ink according to claim 6, wherein the at least one radically curable material comprises an acrylate.

8. The ink according to claim 7, wherein the acrylate is selected from the group consisting of propoxylated neopentyl glycol diacrylate, hexanediol diacrylate, tripropylene glycol diacrylate, dipropylene glycol diacrylate, amine modified polyether acrylates, trimethylolpropane triacrylate, dipentaerythritol penta-/hexa-acrylate, ethoxylated pentaerythritol tetraacrylate, tridecyl acrylate, 2-phenoxyethyl acrylate, 4-t-butylcyclohexyl acrylate, and mixtures thereof.

9. The ink according to claim 6, wherein the second photoinitiator system for curing of the at least one radically curable material is selected from the group consisting of 1-hydroxy-cyclohexylphenylketone, benzophenone, 2,4,6-trimethylbenzophenone, 4-methylbenzophenone, 2-benzyl 2-dimethylamino 1-(4-morpholinophenyl) butanone-1, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, 2,4,6-trimethylbenzoylphenylphosphinic acid ethyl ester, oligo(2-hydroxy-2-methy-1-(4-(1-methylvinyl)phenyl) propanone), 2-hydroxy-2-methyl-1-phenyl-1-propanone, benzyl-dimethylketal, isopropylthioxanthone, and mixtures thereof.

10. The ink according to claim 1, wherein the ink has a viscosity of between about 10 and about 15 cP at temperatures of from about 30 to about 50° C.

11. The ink according to claim 1, wherein the ink further includes an amine synergist.

* * * * *